(12) United States Patent
Fauth et al.

(10) Patent No.: US 9,060,663 B2
(45) Date of Patent: Jun. 23, 2015

(54) WASHING PROGRAMME FOR A DISHWASHER HAVING A SHORTER CYCLE WITH A CONSTANT CLEANING EFFICIENCY

(75) Inventors: Michael Fauth, Pleinfeld (DE); Heinz Heißler, Dillingen (DE); Roland Rieger, Rainau (DE); Michael Rosenbauer, Reimlingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1671 days.

(21) Appl. No.: 12/087,132

(22) PCT Filed: Dec. 1, 2006

(86) PCT No.: PCT/EP2006/069211
§ 371 (c)(1),
(2), (4) Date: Jun. 26, 2008

(87) PCT Pub. No.: WO2007/074022
PCT Pub. Date: Jul. 5, 2007

(65) Prior Publication Data
US 2009/0038644 A1    Feb. 12, 2009

(30) Foreign Application Priority Data
Dec. 27, 2005   (DE) .......................... 10 2005 062 481

(51) Int. Cl.
*A47L 15/00*    (2006.01)
*A47L 15/42*    (2006.01)

(52) U.S. Cl.
CPC ......... *A47L 15/0044* (2013.01); *A47L 15/4293* (2013.01); *A47L 2301/04* (2013.01); *A47L 2501/03* (2013.01); *A47L 2501/05* (2013.01); *A47L 2501/06* (2013.01); *Y02B 40/42* (2013.01)

(58) Field of Classification Search
CPC ............ A47L 15/0044; A47L 15/0047; A47L 15/4293
USPC ............................................... 134/56 D, 47 D
See application file for complete search history.

(56) References Cited

U.S. PATENT DOCUMENTS

| 5,760,493 A | * | 6/1998 | Outcalt et al. | ................... | 307/38 |
| 2002/0069898 A1 | * | 6/2002 | McKee | ....................... | 134/25.2 |
| 2004/0226586 A1 | | 11/2004 | Ertle et al. | | |

FOREIGN PATENT DOCUMENTS

| CH | 665 547 | | 5/1988 |
| CH | 665547 A | * | 5/1988 |

(Continued)

OTHER PUBLICATIONS

Machine Translation of Voegl, CH 665547 A, May 1988.*

(Continued)

*Primary Examiner* — David Cormier
(74) *Attorney, Agent, or Firm* — James E. Howard; Andrea Pallapies

(57) ABSTRACT

A method for cleaning items to be washed in a dishwasher operational using at least one first predetermined wash program sequence including an intensive, low-temperature, automatic or standard program, using a specific mechanical and/or thermal soiling removal energy to achieve a specific cleaning and/or drying result, for carrying out such program steps as pre-rinse, cleaning, intermediate rinse, final rinse and drying, with the predetermined wash program being configured for substantially minimizing the quantity of water and energy used, the method including the steps of applying at least one second predetermined wash program sequence including a rapid intensive, rapid low-temperature, rapid automatic or rapid standard program, using substantially similar mechanical and/or thermal soiling removal energy as first wash program sequence to achieve the substantially similar specific cleaning and/or drying result as first wash program sequence, with second program sequence occurring in less time than first wash program sequence.

25 Claims, 2 Drawing Sheets

(56) References Cited

FOREIGN PATENT DOCUMENTS

| | | |
|---|---|---|
| DE | 42 09 232 | 9/1993 |
| DE | 101 54 630 | 5/2003 |
| EP | 0 596 302 | 5/1994 |
| EP | 0 795 292 | 9/1997 |
| GB | 1 522 153 | 8/1978 |

OTHER PUBLICATIONS

International Search Report PCT/EP2006/069211.

* cited by examiner

WASHING PROGRAMME FOR A DISHWASHER HAVING A SHORTER CYCLE WITH A CONSTANT CLEANING EFFICIENCY

BACKGROUND OF THE INVENTION

The present invention relates to a method for cleaning items to be washed in a dishwasher, in particular a domestic dishwasher, with at least one predetermined sequence of a wash program, e.g. an intensive, low-temperature, automatic or standard program, with a specific mechanical and/or thermal soiling removal energy to achieve a specific cleaning and/or drying result, with which sub-program steps, e.g. pre-rinse, cleaning, intermediate rinse, final rinse and drying, are carried out, with the predetermined sequence of the wash program being configured so that the minimum quantity of water and energy is used.

The invention also relates to a dishwasher, in particular a domestic dishwasher, for implementing the method, comprising a wash compartment to hold items to be washed, a door to open and close the wash compartment, a circulating pump to apply washing water to the items to be washed, a heating unit to heat the washing water, a control facility to control at least one predetermined wash program sequence with a specific mechanical and/or thermal soiling removal energy to achieve a specific cleaning and/or drying result and means for selecting the at least one predetermined sequence of a wash program, e.g. an intensive, low-temperature, automatic or standard program.

Dishwashers today are designed to use a minimum quantity of energy and water. In the case of dishwashers with an upper basket and a lower basket, for this purpose the cleaning of the dishes in the upper basket is separated temporally from the cleaning of the dishes in the lower basket for example. To this end a water switch is used, which acts on either the upper or lower spray level in an alternating manner. The dishwasher is thus able to function with a smaller water reserve and less energy is required to heat this smaller quantity of water.

To reduce energy consumption further, the water temperature is kept at a low level. The water pressure is also reduced, so that the circulating pump, which generates the pressure, can operate more slowly and likewise uses less energy.

The cleaning performance of a dishwasher is primarily a function of the volume flow and temperature of the washing water, the nozzle pressure and the cycle. Therefore all the measures listed above have the effect that the selectable wash programs require more time in order to be able to achieve the same cleaning performance.

The drying performance of the dishwasher is a function of the volume flow of drying air, its temperature and the drying time. Here too energy-saving measures such as reducing the temperature impact on drying time.

Generally the longer operating time is not problematic for such economical dishwashers but there are situations where it is desirable to have the soiled dishes available again for use as quickly as possible. With the currently known rapid programs it is possible to reduce wash time but at the expense of the cleaning and drying result. These rapid programs can therefore only be used for dishes that are slightly soiled and not encrusted.

BRIEF SUMMARY OF THE INVENTION

The object of the invention is therefore to control a modern and economical dishwasher so that it is possible to shorten the time required for the selected wash program in exceptional instances, without any deterioration in the cleaning or drying result.

The object is achieved according to the invention by a method and a dishwasher as described herein.

In an inventive method for cleaning items to be washed in a dishwasher, in particular a domestic dishwasher, with at least one predetermined sequence of a wash program, e.g. an intensive, low-temperature, automatic or standard program, with a specific mechanical and/or thermal soiling removal energy to achieve a specific cleaning and/or drying result, with which sub-program steps, e.g. pre-rinse, cleaning, intermediate rinse, final rinse and drying, are carried out, with the predetermined sequence of the wash program being configured so that a minimum quantity of water and energy is used, with at least one additional predetermined sequence of a wash program, e.g. a rapid intensive, rapid low-temperature, rapid automatic or rapid standard program, with approximately identical mechanical and/or thermal soiling removal energy being provided to achieve the same or approximately the same specific cleaning and/or drying result, with which the wash program cycle is shortened. The mechanical soiling removal energy is the product of the volume flow (of the washing water during cleaning), nozzle pressure (of the washing water during cleaning) and cycle with respectively constant values for volume flow and nozzle pressure over the cycle. If these values are variable over the cycle, the integral should be formed. The thermal soiling removal energy is the integral of the temperature over the corresponding action time or cycle. Because of the necessary heating-up phase, the temperature is subject to fluctuation, so that it is necessary to form an integral for precise determination of the thermal soiling removal energy.

In a further embodiment the water and/or preferably electrical energy consumption is increased.

The additional predetermined wash program sequence, wherein the water and/or energy consumption is increased, allows a user to program a dishwasher, which is economical with water and energy in normal circumstances, in an exceptional instance so that the length of the wash program is shortened and the dishes are available again for use more quickly with the same cleaning and/or drying performance. The already predetermined sequences can be fixed sequences but sequences can also be predetermined, in which the extent of soiling of the dishes is first determined and a program tailored to the determined soiling state is then automatically created (so-called automatic programs). According to the invention such programs can also be modified so that the program time is shorted-whilst still maintaining the cleaning and/or drying result to be achieved.

In order to achieve such program shortening, it is possible to increase the speed of the circulating pump. This increases the water pressure and raises the nozzle pressure in the upper and lower spray levels. The mechanical soiling removal energy is increased as a result and the program time can be shortened. The mechanical soiling removal energy can be defined in terms of the product of volume flow, nozzle pressure and cycle.

According to the invention the water switch, which switches the volume flow with temporal allocation between the upper and lower baskets, so that the upper and lower baskets are supplied simultaneously, is provided as a further measure. The quantity of washing water required here for each sub-program step is higher. It is also possible to increase the speed of the circulating pump even further, as the circulating pump supplies the upper and lower baskets simultaneously.

The temperature is advantageously increased during at least one sub-program step, e.g. pre-rinse, cleaning, intermediate rinse, final rinse or drying. For the rinsing and cleaning steps the washing water pumped through must be heated to a higher temperature for this purpose. For the drying step the drying air is heated more or in the final rinse the temperature is increased, depending on which drying method is used. This measure is applied particularly advantageously to all cleaning and drying steps. This allows the time required for completion of a program to be shortened considerably with the same cleaning and/or drying result still being achieved.

An inventive dishwasher, in particular a domestic dishwasher, for implementing a method comprises a wash compartment for holding items to be washed, a door to open and close the wash compartment, a circulating pump to apply washing water to the items to be washed, a heating unit to heat the washing water, a control facility to control at least one predetermined wash program sequence to achieve a specific cleaning and/or drying result and means for selecting the at least one predetermined wash program sequence with a specific mechanical and/or thermal soiling removal energy, e.g. an intensive, low-temperature, automatic or standard program, it being possible to execute at least one additional predetermined wash program sequence, e.g. a rapid intensive, rapid low-temperature, rapid automatic or rapid standard program, with approximately identical mechanical and/or thermal soiling removal energy to achieve the same or approximately the same specific cleaning and/or drying result with a shortened wash program cycle, preferably by increasing water and/or preferably electrical energy consumption.

An operating element, e.g. a button or knob, can preferably be used to execute and/or select as an additionally predetermined wash program sequence at least one predetermined wash program sequence, which can be selected by the means for selecting the at least one predetermined wash program sequence.

An operating element, e.g. a button, can preferably be used to select and/or execute an additional predetermined wash program sequence.

With most domestic dishwashers different wash programs are provided, which can be selected as a function of the degree of soiling or type of dish to be cleaned. In one exemplary embodiment of the invention the selection of the additional predetermined wash program impacts on all the other predetermined wash programs. This means that when the additionally predetermined wash program is selected, the length of the program is shortened for all the other wash programs. It is then possible to select the correct program for the type and degree of soiling of the dishes, with the length of the program however being shorted for the selected program.

Dishwashers generally have a row of knobs or a rotary knob as their operating element. In one exemplary embodiment of an inventive dishwasher the additional predetermined wash program sequence is selected using the same operating element. This means that the shortened time is only assigned to one specific program and this time-saving program can be selected with a rotary knob for example in the same way as the other programs. In the case of the rotary knob an additional selectable program point is assigned to a specific position of the rotary knob for this purpose, while an additional knob is provided in the case of a row of knobs.

It is however particularly advantageous for a dishwasher if every one of the selectable programs can be completed in a shorter time. To this end a separate knob is provided, the actuation of which impacts on all possible settings both in the case of a dishwasher with a rotary knob and also in the case of an appliance with a row of knobs.

The dishwasher can preferably have a display element, e.g. a LED, which indicates the operation or input of the additional predetermined wash program sequence to achieve the same or approximately the same specific cleaning result.

BRIEF DESCRIPTION OF THE DRAWINGS

Further details and advantages of the invention will emerge from the subclaims in conjunction with the description of an exemplary embodiment, which is described in detail with reference to the drawings, in which:

DETAILED DESCRIPTION OF THE PRESENT INVENTION

Figure 1:
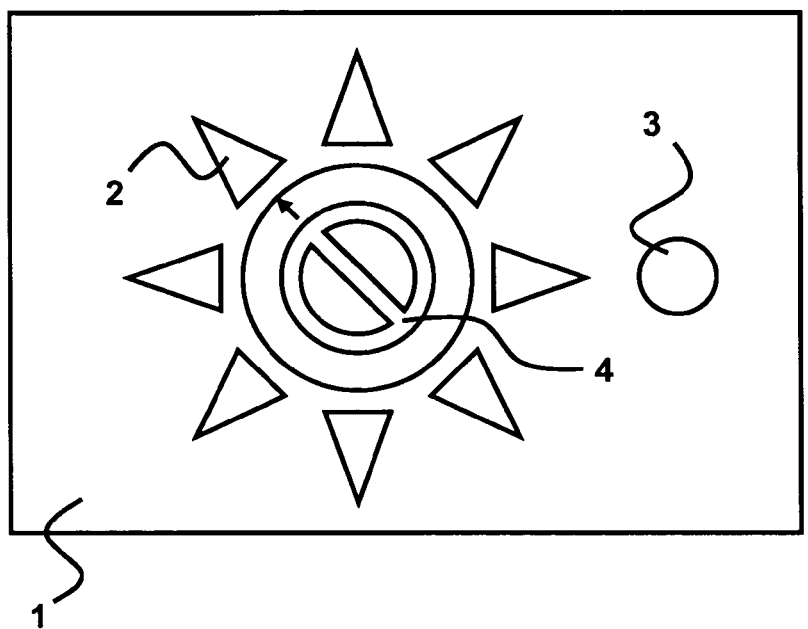
FIG. 1 shows the operating panel of an inventive dishwasher with a rotary knob.
Figure 3:
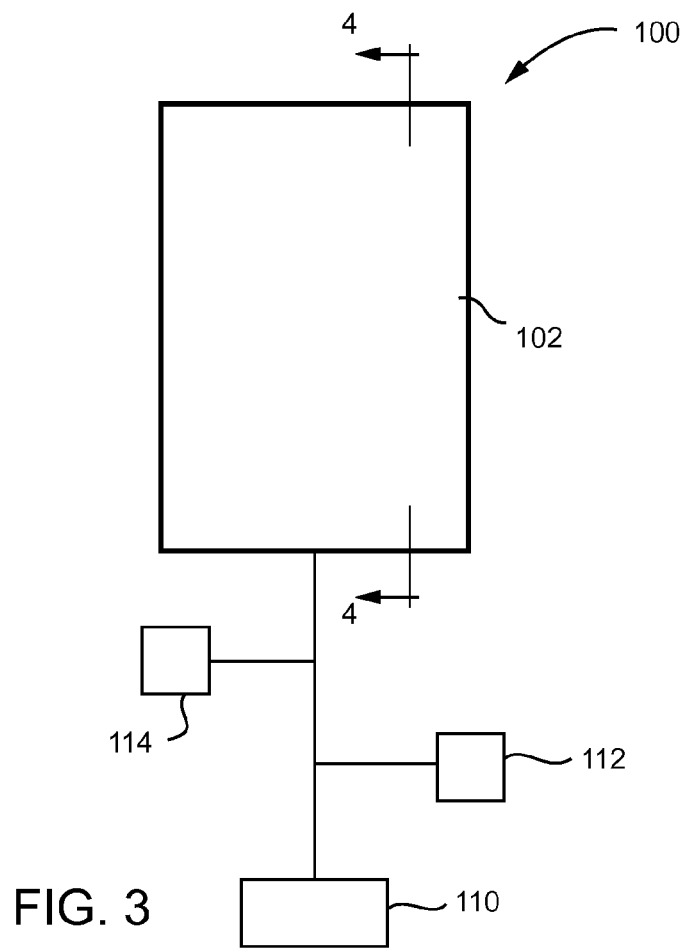
FIG. 3 is a front view of a dishwasher according to an example of the disclosed technology.
Figure 4:
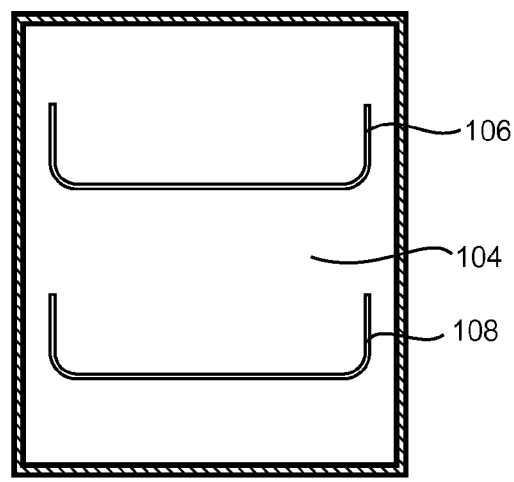
FIG. 4 is a cross-sectional view along the line 4-4 in FIG. 3.

Referring to FIGS. 3 and 4, a dishwasher 100 is shown. The dishwasher includes a door 102, a wash compartment 104, upper and lower baskets 106, 108, a circulating pump 110, a heating unit 112 and a control facility 114. The operating panel 1 shown in FIG. 1 has a rotary knob 4. The individual wash programs are shown symbolically by the markings 2. To select the required program, the rotary knob 4 is set to the marking 2 for the corresponding program with the arrow shown.

The operating panel 1 also has a knob 3, which can be marked in a particularly striking manner. Activation of this knob 3 must be easy to identify visually. For example an LED (not shown) could start to glow or flash. It would also be possible for the knob 3 itself to glow or flash in the depressed position.

Pressing the knob 3 could impact in the same manner on all programs that can be selected with the rotary knob 4. Thus for example pressing the knob 3 in the rinse and cleaning steps could bring about a 10° C. temperature increase. Also the speed of the circulating pump could be increased in all programs, so that it is possible to operate with higher nozzle pressures in the individual spray levels. This would result in a shortening of the wash time in all programs, without the cleaning result deteriorating.

However pressing the knob 3 can impact differently on each program. Thus for example a low-temperature program, used for dishes with delicate decoration, can be modified so that only the water level in the machine is increased slightly and the water switch is switched so that the upper and lower baskets are no longer supplied with washing water in an alternating manner but simultaneously. This allows the program to be shortened, in return for only a small increase in water consumption. The delicate dishes are however not subjected to greater stress as a result.

Figure 2:
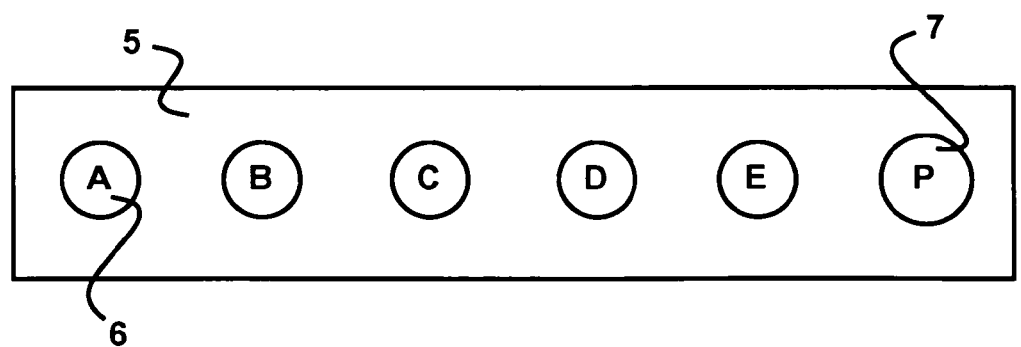
FIG. 2 shows the operating panel of an inventive dishwasher with a row of knobs.

The operating panel in FIG. 2 is configured as a row of knobs 5. The selectable programs here are assigned to the knobs 6, which are identified symbolically here by letters A to E. The knob 7, shown with the letter P, must be characterized in its active position in the same way as the knob 3 in FIG. 1. To highlight the special function of knob 7, it is configured larger than the other knobs.

The knob 7 can be assigned to a rapid program, with which the same cleaning and drying result is achieved as with the selection of a universal program, which is selected for example using the knob C. However with this rapid program the quantity of water required is increased and energy consumption rises.

It is possible here too for the knob marked P to be linked to in any manner to another program knob A to E and for its activation to have a very different impact on the various wash programs. Some examples are set out and explained below:

EXAMPLE 1

| Rapid program | Cleaning temperature | Final rinse temperature | Water switch | Circulating pump | Drying temperature |
|---|---|---|---|---|---|
| No | 50° C. | 65° C. | Alternating | Mid-range | 65° C. |
| Yes | 50° C. | 65° C. | Simultaneous | High range | 65° C. |
| Yes | 50° C. | 65° C. | Simultaneous | Mid-range | 65° C. |

In this example—as with the low-temperature program described above—activating the rapid program only changes control of the water switch (the water switch activates either both spray arms simultaneously with water or the spray arms in an alternating manner; not shown) so that the upper and lower baskets are no longer supplied with water in an alternating manner but simultaneously. In order to be able to generate the larger volume flow of washing water without reducing the nozzle pressure in the spray levels, the speed of the circulating pump and the water level in the appliance can also be increased. This increases water consumption slightly from approximately 14 to 15 liters for example and energy consumption slightly from approximately 1.05 to 1.44 kWh for example. The time required for completion of a wash program can thus be reduced from approximately 140 to approximately 70 mins with the same cleaning and drying performance.

EXAMPLE 2

| Rapid program | Cleaning temperature | Final rinse temperature | Water switch | Circulating pump | Drying temperature |
|---|---|---|---|---|---|
| No | 50° C. | 65° C. | Alternating | Mid-range | 65° C. |
| Yes | 72° C. | 72° C. | Alternating | Mid-range | 72° C. |

In the example shown here activating the rapid program increases the temperature in all cleaning and rinsing steps. The drying temperature is also increased. The higher water temperature is achieved by more frequent heating phases. The measures shown increase energy consumption from approximately 1.05 to 1.44 kWh for example, while water consumption remains the same. The required program time is reduced to half from approximately 140 to approximately 70 mins.

EXAMPLE 3

| Rapid program | Cleaning temperature | Final rinse temperature | Water switch | Circulating pump | Drying temperature |
|---|---|---|---|---|---|
| No | 50° C. | 65° C. | Alternating | Mid-range | 65° C. |
| Yes | 50° C. | 65° C. | Alternating | High range | 65° C. |

In this third example only the speed of the circulating pump and therefore the nozzle pressure in the spray levels is increased. This increases energy consumption only from approximately 1.05 to 1.44 for example, while water consumption remains the same. The time required is reduced from approximately 140 to approximately 110 mins.

Naturally the described measures can be combined with one another in any manner to save even more time. However energy and water consumption then rise accordingly.

The invention claimed is:

1. A method for cleaning items to be washed in a domestic dishwasher that includes a wash compartment to hold items to be washed, a circulating pump to apply washing water to the washing compartment, a heating unit to heat the washing water and a control facility to control and execute at least one user-selectable first pre-programmed wash program sequence and at least one user-selectable, second pre-programmed wash program sequence, the dishwasher being operational using the at least one user-selectable first pre-programmed wash program sequence executed by the dishwasher and including an intensive, low-temperature, automatic or standard program, each associated with a specific mechanical soiling removal energy to achieve a specific cleaning and/or drying result, for carrying out one or more program steps including one or more of pre-rinse, cleaning, intermediate rinse, final rinse and drying, with the at least one first pre-programmed wash program sequence being configured for substantially minimizing the quantity of water and energy used, the method including the steps of:
applying the at least one user-selectable, second pre-programmed wash program sequence executable by the dishwasher including a rapid intensive, rapid low-temperature, rapid automatic or rapid standard program, using substantially the same mechanical soiling removal energy as the respective intensive, low-temperature, automatic and standard programs of the first pre-programmed wash program sequence to achieve the substantially similar specific cleaning and/or drying result as the first pre-programmed wash program sequence, with the second pre-programmed wash program sequence occurring in less time than the first pre-programmed wash program sequence.

2. The method according to claim 1 wherein at least one of water and electrical energy consumption is increased in the second pre-programmed wash program sequence.

3. The method according to claim 1 wherein with the at least one second pre-programmed wash program sequence the speed of a circulating pump for circulating the washing water is increased relative to the first pre-programmed wash program sequence to increase the mechanical soiling removal energy per unit time acting on the items to be washed.

4. The method according to claim 1 wherein with the at least one second pre-programmed wash program sequence an upper basket and a lower basket of the dishwasher are subjected to washing water simultaneously thereby increasing the mechanical soiling removal energy per unit time acting on the items to be washed.

5. The method according to claim 1, further comprising a thermal soiling removal energy of the first pre-programmed wash program sequence being substantially the same as a thermal soiling removal energy of the second pre-programmed wash program sequence, wherein with the at least one second pre-programmed wash program sequence a water temperature is increased relative to the first pre-programmed wash program sequence during at least one sub-program step, thereby increasing at least one of the thermal soiling removal energy and a drying performance per unit time.

6. The method according to claim 1 wherein a plurality of different pre-programmed wash programs are available for use and using the second pre-programmed wash program increases at least one of water and energy consumption for all pre-programmed wash programs, thereby shortening an operational cycle of the dishwasher.

7. A domestic dishwasher wherein a plurality of different user-selectable, pre-programmed wash programs are available for execution by the dishwasher, the dishwasher including:
a wash compartment to hold the items to be washed, with the wash compartment forming an access opening thereinto;
a door to open and close the wash compartment access opening;
a circulating pump to apply washing water to the washing compartment for application to the items to be washed;
a heating unit to heat the washing water; and
a control facility to control and execute at least first and second pre-programmed sequences to achieve a specific cleaning and/or drying result,
the first pre-programmed wash program sequence including an intensive, low-temperature, automatic or standard program, each being associated with a specific mechanical soiling removal energy to achieve a specific cleaning and/or drying result, for carrying out one or more program steps including one or more of pre-rinse, cleaning, intermediate rinse, final rinse and/or drying, with the pre-programmed wash programs of the first pre-programmed wash program sequence being configured for substantially minimizing the quantity of water and energy used,
the second pre-programmed wash program sequence including a rapid intensive, rapid low-temperature, rapid automatic or rapid standard program, using substantially the same mechanical soiling removal energy as the respective intensive, low temperature, automatic and standard programs of the first pre-programmed wash program sequence to achieve a substantially similar specific cleaning and/or drying result as the first pre-programmed wash program sequence, with the second pre-programmed wash program sequence occurring in less time than the first pre-programmed wash program sequence.

8. The dishwasher according to claim 7, wherein the control facility is configured to execute a program substep to cause an increase in at least one of water and electrical energy consumption.

9. The dishwasher, according to claim 7 and further comprising an operating element in operational communication with the control facility for selecting for execution as an additionally pre-programmed wash program sequence, the second pre-programmed wash program sequence.

10. The dishwasher according to claim 7 and further comprising an operating element in operational communication with the control facility for selecting for execution the second pre-programmed wash program sequence.

11. The dishwasher according to claim 7 and further comprising a display element which indicates at least one of the selection and operation of the second pre-programmed wash program sequence.

12. The dishwasher according to claim 7, wherein the second pre-programmed wash program sequence is pre-programmed to increase the speed of the circulating pump relative to the first pre-programmed wash program sequence for circulating the washing water to increase the mechanical soiling removal energy per unit time acting on the items to be washed.

13. The dishwasher according to claim 7, wherein the second pre-programmed wash program sequence is pre-programmed to simultaneously subject an upper basket and a lower basket of the dishwasher to washing water thereby increasing the mechanical soiling removal energy per unit time acting on the items to be washed.

14. A domestic dishwasher including:
a wash compartment to hold the items to be washed, with the wash compartment forming an access opening thereinto;
a door to open and close the wash compartment access opening;
a circulating pump to apply washing water to the washing compartment for application to the items to be washed;
a heating unit to heat the washing water; and
a control facility to control at least first and second user-selectable, pre-programmed wash program sequences executable by the dishwasher to achieve a specific cleaning and/or drying result,
the first wash program sequence including at least a first wash program, associated with a specific thermal soiling removal energy to achieve a specific cleaning and/or drying result, with the first wash program being pre-programmed to substantially minimize the quantity of water and energy used,
the second wash program sequence including a rapid wash program, using substantially the same thermal soiling removal energy as the first wash program to achieve a substantially similar specific cleaning and/or drying result as the first wash program, with the rapid wash program occurring in less time than the first wash program, the second wash program sequence being programmed and executable by the dishwasher to increase a temperature of the washing water, a rinsing water and/or a drying air relative to the first wash program sequence.

15. The dishwasher according to claim 14, further comprising a mechanical soiling removal energy of the first wash program sequence being substantially the same as a mechanical soiling removal energy of the second wash program sequence, wherein the second wash program sequence is pre-programmed and configured to increase water consumption relative to the first wash program sequence.

16. The dishwasher according to claim 15, wherein the second wash program sequence is pre-programmed and executable by the dishwasher to increase electrical energy consumption relative to the first wash program sequence.

17. The dishwasher according to claim 14, wherein the second wash program sequence is pre-programmed and executable by the dishwasher to increase electrical energy consumption relative to the first wash program sequence.

18. The dishwasher, according to claim 14, and further comprising an operating element in operational communication with the control facility to select for execution the second predetermined wash program sequence.

19. The dishwasher according to claim 14, further comprising a display element which indicates at least one of the selection and operation of the second wash program sequence.

20. The dishwasher according to claim 14, further comprising a mechanical soiling removal energy of the first wash program sequence being substantially the same as a mechanical soiling removal energy of the second wash program sequence, wherein the second wash program sequence is pre-programmed to increase the speed of the circulating pump relative to the first wash program sequence for circulating the washing water to increase the mechanical soiling removal energy per unit time acting on the items to be washed.

21. The dishwasher according to claim 14, further comprising a mechanical soiling removal energy of the first wash program sequence being substantially the same as a mechanical soiling removal energy of the second wash program sequence, wherein the second wash program sequence is pre-programmed to simultaneously subject an upper basket and a lower basket of the dishwasher to washing water thereby increasing the mechanical soiling removal energy per unit time acting on the items to be washed.

22. The dishwasher according to claim 14, wherein the second wash program sequence is pre-programmed to increase the temperature of the washing water, the rinsing water and/or the drying air relative to the first wash program sequence during at least one sub-program step, thereby increasing the thermal soiling removal energy and/or the drying performance per unit time.

23. The dishwasher according to claim 22, wherein the second wash program sequence is pre-programmed to increase the temperature of the washing water relative to the first wash program sequence during at least one sub-program step.

24. The dishwasher according to claim 22, wherein the second wash program sequence is pre-programmed to increase the temperature of the rinsing water relative to the first wash program sequence during at least one sub-program step.

25. The dishwasher according to claim 22, wherein the second wash program sequence is pre-programmed to increase the temperature of the drying air relative to the first wash program sequence during at least one sub-program step.

* * * * *